United States Patent
Kawashima et al.

(10) Patent No.: US 6,951,235 B2
(45) Date of Patent: Oct. 4, 2005

(54) METHOD AND APPARATUS FOR FORMING CARVED GROOVE OF GREEN TIRE

(75) Inventors: Masafumi Kawashima, Kodaira (JP); Satoru Syudou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/945,706

(22) Filed: Sep. 5, 2001

(65) Prior Publication Data

US 2002/0035908 A1 Mar. 28, 2002

(30) Foreign Application Priority Data

Sep. 7, 2000 (JP) .......................................... 2000-271006

(51) Int. Cl.[7] .............................................. B29D 30/00
(52) U.S. Cl. ............................... 157/13; 83/13; 83/76.6; 83/875
(58) Field of Search ............................ 83/875, 13, 856, 83/368, 733, 951, 877, 881, 76.6–76.9; 157/13; 156/535

(56) References Cited

U.S. PATENT DOCUMENTS

| | | | |
|---|---|---|---|
| 1,521,238 A | | 12/1924 | Gammeter |
| 3,502,131 A | * | 3/1970 | Rawls .......................... 157/13 |
| 4,081,017 A | * | 3/1978 | Appleby et al. ............... 157/13 |
| 4,206,798 A | * | 6/1980 | Ray et al. ..................... 157/13 |
| 4,668,456 A | * | 5/1987 | Collier ......................... 264/161 |
| 4,682,641 A | | 7/1987 | Watanabe et al. |
| 4,782,881 A | | 11/1988 | Brinkley et al. |
| 4,817,697 A | * | 4/1989 | Takami et al. ................ 157/13 |
| 4,943,331 A | * | 7/1990 | Kawabata .................... 156/129 |
| 5,005,628 A | * | 4/1991 | Kinuhata et al. ............. 157/13 |
| 5,065,804 A | * | 11/1991 | Kinuhata et al. ............. 157/13 |
| 5,074,346 A | * | 12/1991 | Kinuhata et al. ............. 157/13 |
| 5,179,782 A | | 1/1993 | Van Alstine |
| 5,193,600 A | * | 3/1993 | Kinuhata et al. ............. 157/13 |
| 5,238,041 A | * | 8/1993 | Tomita et al. ................ 157/13 |

FOREIGN PATENT DOCUMENTS

| | | |
|---|---|---|
| DE | 196 42 283 A1 | 4/1998 |
| EP | 0 038 278 A1 | 10/1981 |
| EP | 0 190 914 A2 | 8/1986 |
| EP | 0 324 959 A2 | 7/1989 |
| EP | 1 074 379 A2 | 2/2001 |
| GB | 1 220 890 A | 1/1971 |

* cited by examiner

Primary Examiner—Allan N. Shoap
Assistant Examiner—Phong Nguyen
(74) Attorney, Agent, or Firm—Sughrue Mion, PLLC

(57) ABSTRACT

A method and an apparatus for forming a carved groove of a green tire capable of forming a carved groove of a necessary depth without being influenced by variation of outer diameters of the green tire is provided. In a method and an apparatus for forming a carved groove for a lug groove with a cutter on an outer circumferential surface of a green tire before curing, a distance sensor is moved along a portion to be carved on the outer circumferential surface of the green tire to measure outer diameters of the portion to be carved, cut shape data for a green tire having an ideal shape stored in memory beforehand is revised on the basis of the measured outer diameters, and the cutter is moved in accordance with the revised cut shape data for carving.

25 Claims, 6 Drawing Sheets

METHOD AND APPARATUS FOR FORMING CARVED GROOVE OF GREEN TIRE

BACKGROUND OF THE INVENTION

1. Field of the Invention

The present invention relates to a method and an apparatus for forming a carved groove for a lug groove with a cutter on an outer circumferential surface of a green tire before curing.

2. Description of the Related Art

FIG. 7 shows a conventional carved groove forming apparatus 01 used for carving a carved groove for a lug groove with a cutter on an outer circumferential surface of a green tire.

A green tire G has a central axis supported horizontally. The carved groove forming apparatus 01 has a base stand 03 laid on a rail 02 so as to move toward the green tire perpendicularly to the central axis of the green tire G and horizontally (in direction X). The base stand 03 has a rotary shaft 04 projected in direction X toward the green tire G. The rotary shaft 04 is provided with a rotary disk 05 integrally.

The rotary disk 05 has a pair of rails 06 along which a slide disk 07 slides. The slide disk 07 has a cutter 08 and a photo-sensor 09. The cutter 08 stands up and falls down relatively to the slide disk according to action of an air cylinder. Carving of the green tire G by the carved groove forming apparatus 01 is carried out as follows.

Firstly, outer circumference of the green tire G is partitioned off into 36 portions, and in each portion as shown in FIG. 8, a cut shape (shown by one-dot-dash line in FIG. 8) is described on the outer circumferential surface of the green tire by marking-off.

Next, referring to FIG. 9, the photo-sensor 09 detects cut starting point A and measures distance, the base stand 03 is moved in the direction X so that the fallen cutter 08 positions at a place distant from the green tire G by a predetermined distance, then the rotary shaft 04 and the rotary disk 05 are rotated together by hand to set direction of the rail 06 so that the cutter 08 moves in direction of angle of marking-off of the cut shape.

After that, the cutter 08 is revolved to stand up by the air cylinder, and eats into the green tire G by a predetermined depth at the cut starting point A as shown in FIG. 9.

Next, slide disk is moved together with the cutter 08 along the rail 02 by hand to form the carved groove.

In case of a green tire, variation of outer diameters is large compared with variation of tread gauges. When the green tire is cured, a mold having lug groove ribs projected from the inner circumferential surface is put on the green tire with the lug groove ribs engaged with the carved grooves of the green tire, and inner pressure is applied to the green tire to press the green tire against the inner circumferential surface of the mold and form lug grooves of a product tire.

Therefore, even if variation of outer diameters of the green tire is large, the variation is dissolved by curing and the product tire of substantially true circle is obtained.

In this specification, the distance from the central axis to the outer circumferential surface of the green tire is called the outer diameter.

FIG. 9 shows a state of the green tire G in which outer diameters vary largely in particular. In this green tire G, if the cutter 08 is moved in parallel with the central axis C–C' of the green tire G, a carved groove of uneven depth as shown by the broken line is formed, and the uneven depth remains as it is when the green tire is deformed into a state near a true circle by the above-mentioned inner pressure. Therefore, shape of the lug groove rib and shape of the carved groove are different from each other largely, so that an accurate lug groove can not be formed.

Thus, the portion to be carved of the green tire is carved to a necessary depth only at the cut starting point A, and another part of the portion to be carved can not be carved to the necessary depth because the depth is influenced by variation of the outer diameters.

SUMMARY OF THE INVENTION

The present invention has been accomplished in view of the foregoing, and an object of the invention is to provide a method and an apparatus for forming a carved groove of a green tire capable of forming a carved groove of a necessary depth without being influenced by variation of outer diameters of the green tire.

In order to achieve the above object, the present invention provides a method for forming a carved groove for a lug groove with a cutter on an outer circumferential surface of a green tire before curing, comprising: moving a distance sensor along a portion to be carved on the outer circumferential surface of the green tire to measure outer diameters of the portion to be carved; revising cut shape data for a green tire having an ideal shape stored in memory beforehand on the basis of the measured outer diameters; and moving the cutter in accordance with the revised cut shape data for carving.

Since the cut shape data for a green tire having an ideal shape is revised on the basis of the measured outer diameters, and carving is carried out in accordance with the revised cut shape data, even if outer diameters of the green tire vary, a carved groove having necessary depths is formed on the green tire.

When the green tire is deformed by inner pressure into a substantially true circular shape on curing, the carved groove becomes the necessary shape similar to the shape of the lug groove rib, so that the lug groove rib enters the carved groove properly and an accurate lug groove is formed.

Measurement of the outer diameters of the portion to be carved may comprise moving the distance sensor to detect distances to the outer circumferential surface of the green tire at plural points continuously or intermittently, and subtracting the detected distances from the distance between the distance sensor and a central axis of the green tire to calculate outer diameters of the portion to be carved at plural points.

Since distances between the distance sensor and the surface of the portion to be carved are detected at plural points and subtracted from a distance between the distance sensor and the central axis of the green tire, outer diameters at plural points of the portion to be carved can be measured easily The cut shape data stored beforehand may be revised on the basis of difference between the measured outer diameter of the green tire and an outer diameter of a green tire having an ideal shape.

Since difference between the measured diameter of the green tire and an outer diameter of a green tire having an ideal shape shows variation of the outer diameter of the green tire, if the cut shape data stored beforehand is revised on the basis of the above difference, a carved groove having necessary depths can be formed.

The present invention provides an apparatus for forming a carved groove for a lug groove on an outer circumferential surface of a green tire before curing, comprising: a cutter for carving the outer circumferential surface of the green tire to form the carved groove; a cutter moving means for moving the cutter; a distance sensor for detecting distance to the outer circumferential surface of the green tire; a sensor moving means for moving the distance sensor; and a control means for storing cut shape data for a green tire having an ideal shape and controlling the cutter moving means and the sensor moving means, the control means controlling the sensor moving means so that the distance sensor moves along a portion to be carved on the outer circumferential surface of the green tire to measure outer diameters of the portion to be carved, revising the cut shape data stored beforehand on the basis of the measured outer diameter of the portion to be carved, controlling the cutter moving means in accordance with the revised cut shape data so that the cutter carves a necessary place of the outer circumferential surface of the green tire to form the carved groove.

Since the control means measures the outer diameter of the portion to be carved, revises the cut shape data and moves the cutter to carve a necessary place of outer circumferential surface of the green tire, compared with a case that the cutter is operated manually to carve the green tire, a carved groove having necessary depths can be formed accurately, efficiently and automatically.

The cutter and the distance sensor may be fixed to a same support member, and the cutter moving means and the sensor moving means may be constituted by a common moving means.

Since it is unnecessary to provide two moving means for the distance sensor and the cutter, the apparatus can be simplified and cost can be reduced.

The common moving means may be a multi-joint robot.

Position, attitude and moving direction of the cutter can be set accurately and freely so that a proper carved groove can be formed on the green tire.

The multi-joint robot may have degree of freedom of six axes.

The cutter can be supported taking an attitude most suitable for carving of the green tire so that a carved groove having necessary depths can be formed accurately.

The distance sensor may be a reflective photo-sensor.

Light projected from the photo-sensor scans surface of the portion to be carved of the green tire and reflected light is received by the photo-sensor to detect distance to the surface. Outer diameters of the portion to be carved can be measured successively smoothly, and working efficiency can be improved.

DETAILED DESCRIPTION OF THE PREFERRED EMBODIMENT

Hereinafter, an embodiment of the present invention will be described with reference to FIGS. 1 to 6.

Figure 1:
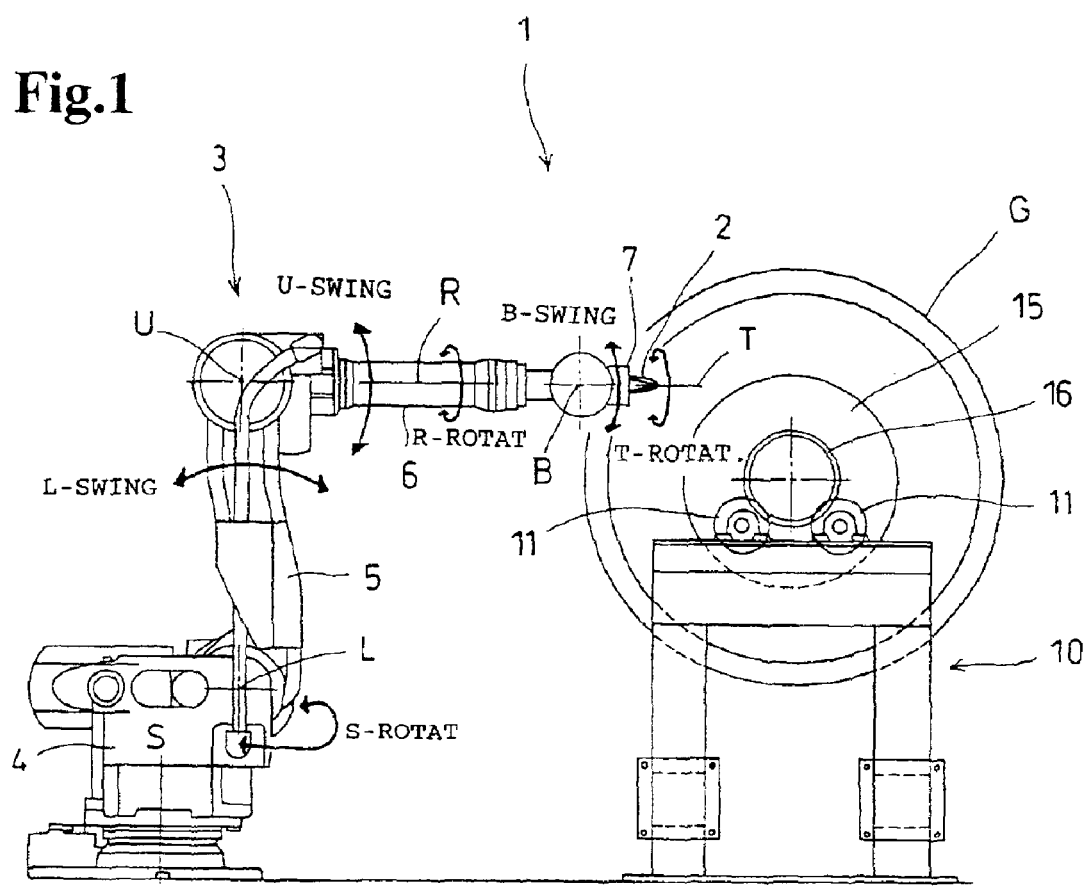
FIG. 1 is an entire side view of a carved groove forming apparatus according to an embodiment of the present invention.

The carved groove forming apparatus 1 according to the embodiment shown in FIG. 1 relates to manufacturing of ORR (off the road radial) tire of a large-sized vehicle for construction.

The carved groove forming apparatus 1 comprises a multi-joint robot 3 capable of manipulating a cutter 2 freely and a support stand for supporting a green tire G so as to rotate, and the multi-joint robot 3 and the support stand 10 are arranged face to face apart from each other by a predetermined distance.

The multi-joint robot 3 has degree of freedom of six axes.

A rotary base stand 4 is provided on a floor so as to rotate about a vertical axis S horizontally (S-rotation), a first arm 5 extending upward is connected to the rotary base stand 4 so as to swing about a horizontal axis L before and after (L-swing), and a second arm 6 extending forward is connected to an upper end of the first arm 5 so as to swing about a horizontal axis U up and down (U-swing). The second arm 6 rotates about the arm center axis R (R-rotation). A third arm 7 is connected to a tip end of the second arm 6 so as to swing about an axis B right-angled to the arm center axis R (B-swing). The cutter 2 is projected at a tip end of the third arm 7 so as to rotate about the arm center axis T (T-rotation).

Figure 2:
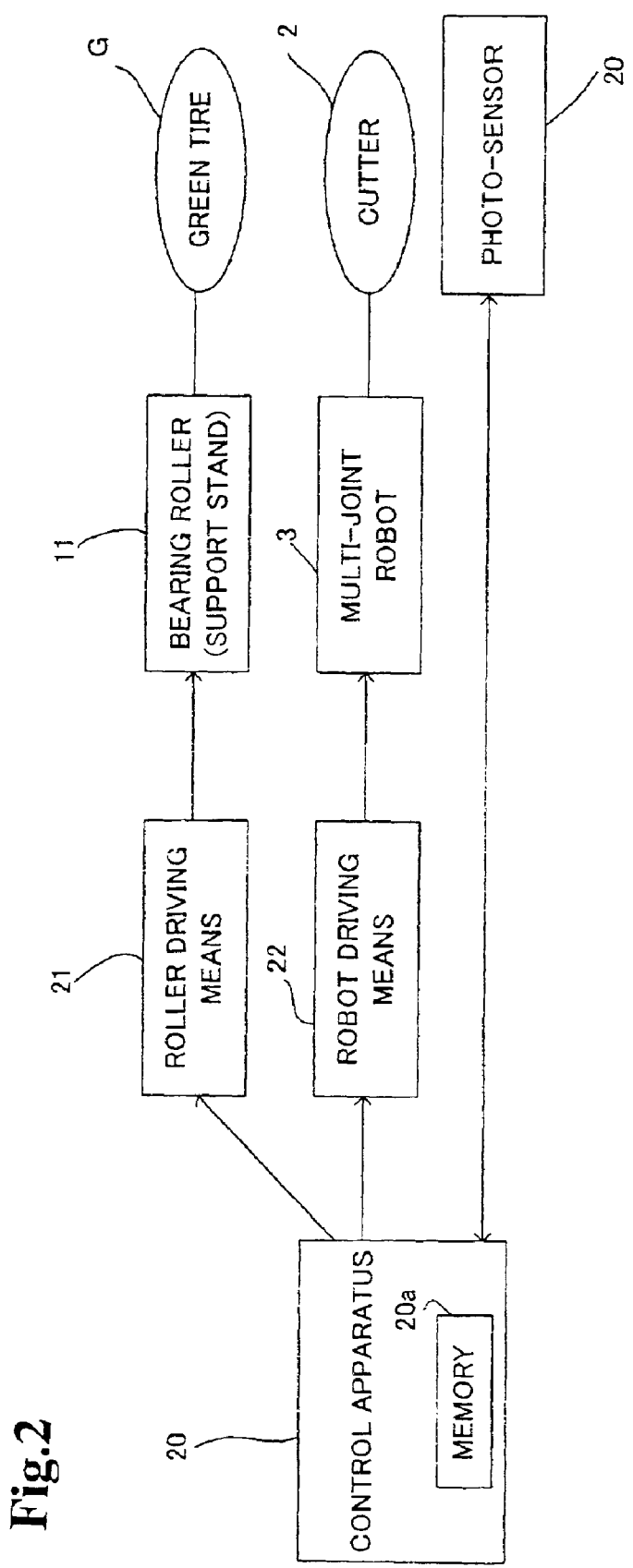
FIG. 2 is a brief block diagram of a control system.

To a tip end of the third arm 7 is attached a photo-sensor 8 which rotates about the axis T together with the cutter 2 (FIG. 2).

As described above, the cutter 2 is a terminal end of the multi-joint robot 3 having degree of freedom of six axes (S-rotation, L-swing, U-swing, R-rotation, B-swing and T-rotation).

Therefore, position, attitude and movement of the cutter can be changed very freely.

The cutter 2 is a electric heated cutter having an edge curved in U-shape and carves the green tire melting it.

On the other side, the green tire is supported by a rim 15 having a central shaft 16 projected horizontally on both sides. The shaft 16 is supported on a support stand through a pair of bearing rollers 11.

The above-mentioned carved groove forming apparatus 1 is controlled by a control apparatus 20. FIG. 2 shows a brief block diagram of the control system.

The control apparatus 20 outputs an instruction signal to a roller driving means 21 which drives the bearing rollers 11 of the support stand 10 to rotate the green tire. On the one hand, the control apparatus 20 outputs an instruction signal to a robot driving means 22 which drives the multi-joint robot 3 to move the cutter 3 for carving work.

Further, the control apparatus 20 outputs a signal to the photo-sensor 8. The photo-sensor 8 projects a light which is reflected by a reflective surface as a reflective light. A signal indicating the reflective light is received by the control apparatus for calculating distance between the photo-sensor 8 and the reflective surface.

The control apparatus 20 has a memory 20a in which cut shape data for a green tire having an ideal shape are stored beforehand regarding every kind of tires.

Figure 3:
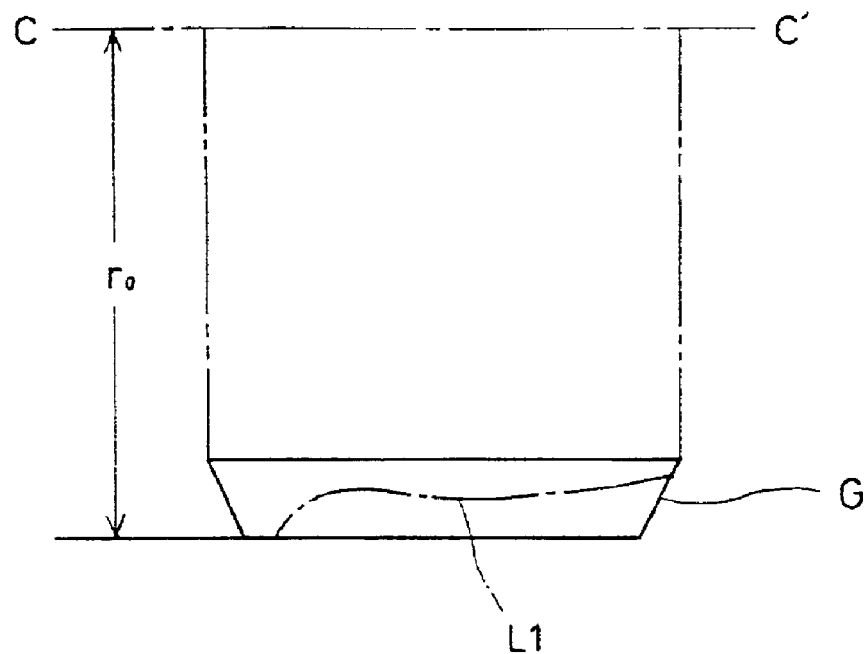
FIG. 3 is a sectional view of a tread portion of a green tire having an ideal shape.

FIG. 3 shows a section of a tread portion of a green tire having an ideal shape of even outer diameters.

Namely, the green tire G of ideal shape has predetermined constant outer diameters (distance from the center axis to the outer circumferential surface) $r_0$. The one-dot-dash line L1 of FIG. 3 shows a shape of a carved groove corresponding to the cut shape data in such a green tire G.

If a green tire has an ideal shape, the multi-joint robot 3 is controlled in accordance with the stored, not revised cut shape data and the cutter 2 is moved along the one-dot-dash line L1 of FIG. 3 to form a carved groove of necessary shape as shown by the one-dot-dash line L1.

Figure 4:
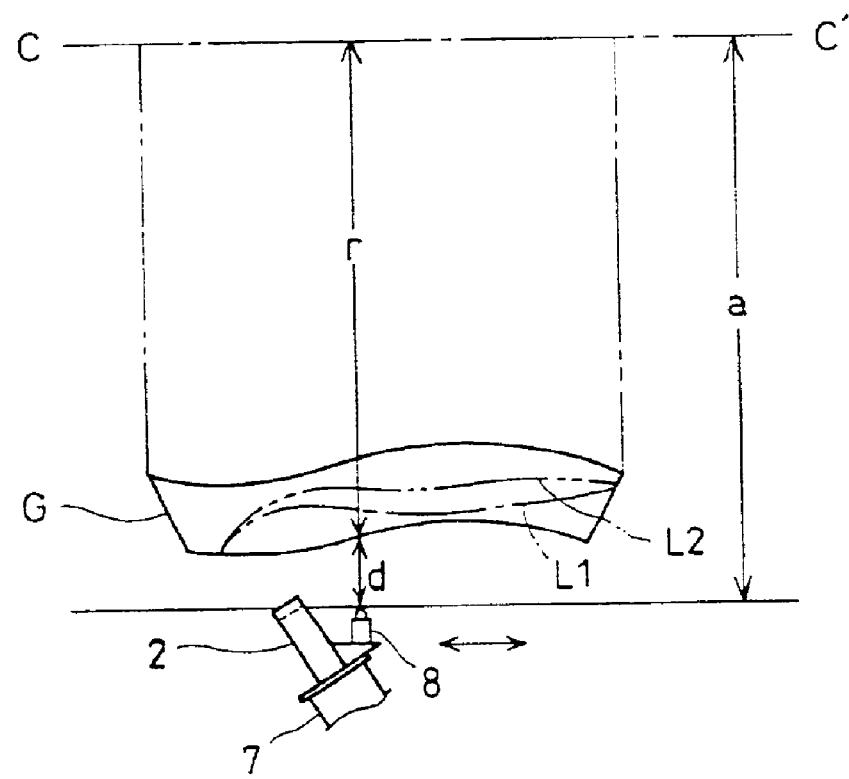
FIG. 4 is a sectional view of a tread portion of an ordinary green tire having variation of outer diameters.
Figure 5:
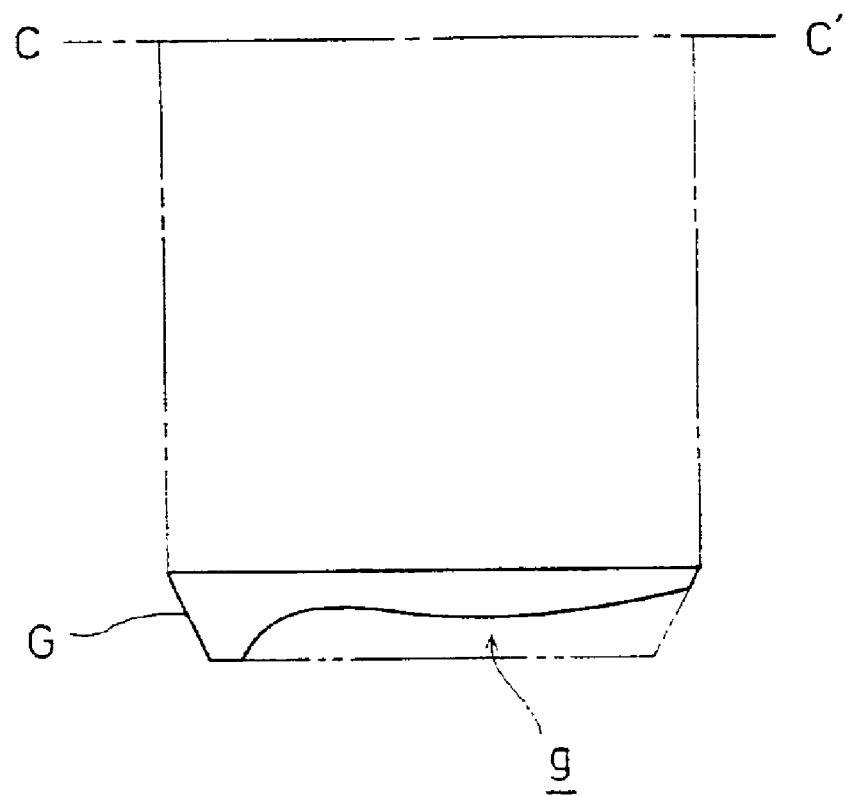
FIG. 5 is a sectional view showing deformation of a tread portion of a green tire when it is cured.
Figure 6:
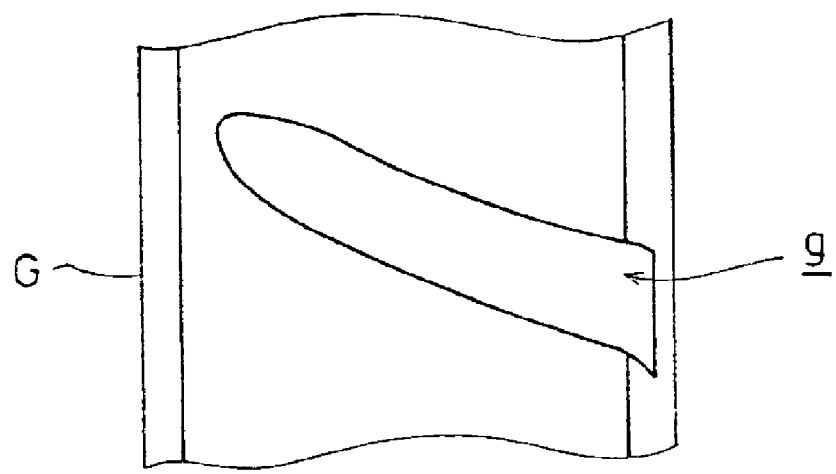
FIG. 6 is a plan view of the same tread portion.
Figure 7:
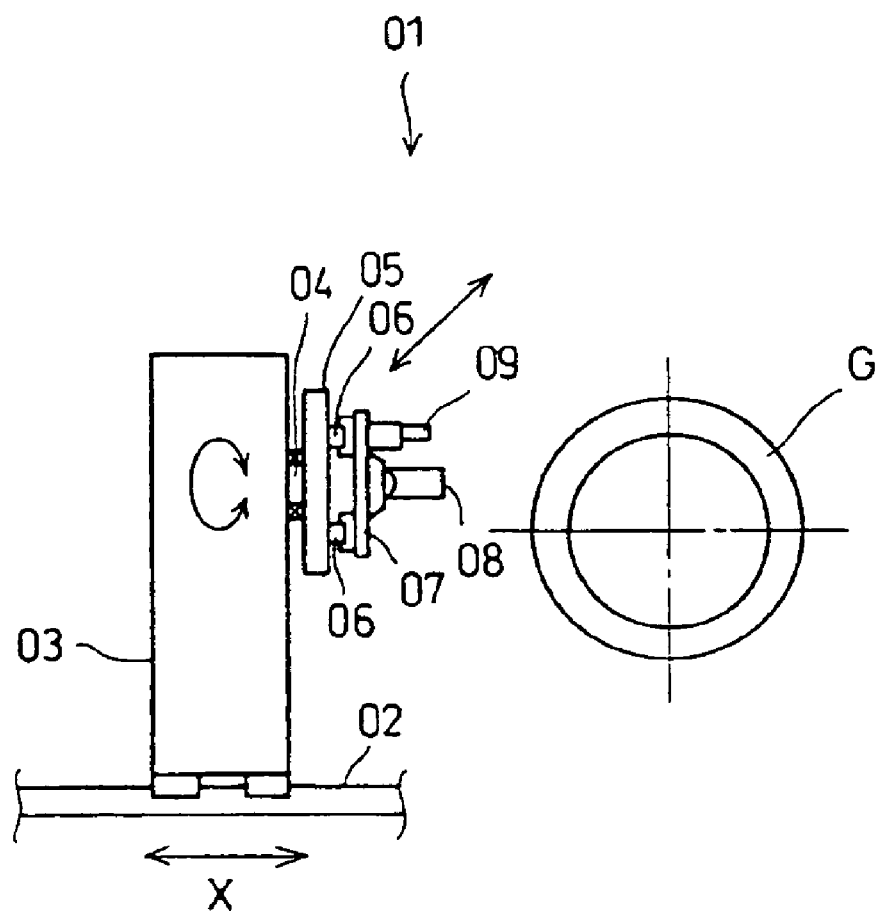
FIG. 7 is a entire side view of a conventional carved groove forming apparatus.
Figure 8:
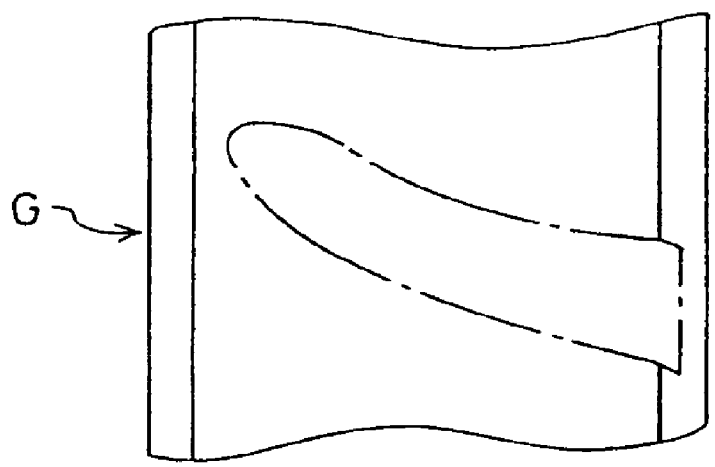
FIG. 8 is a view showing a surface of a green tire marked-off.
Figure 9:
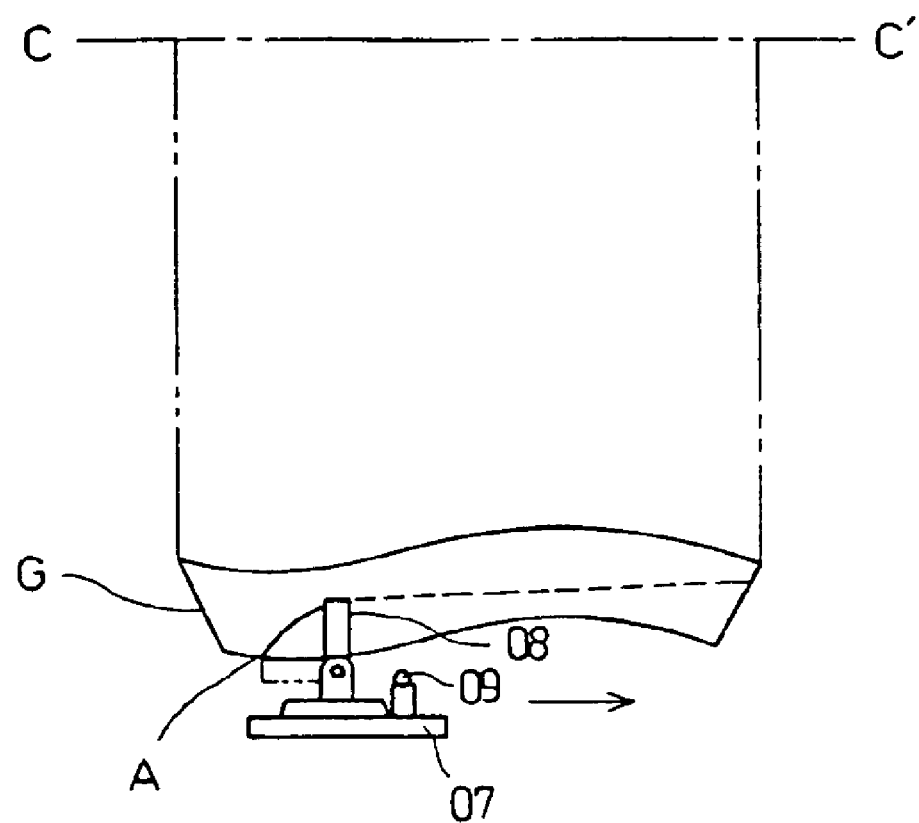
FIG. 9 is a sectional view of a tread portion of a green tire being carved with a cutter of the conventional carved groove forming apparatus.

In general, however, the outer diameters r are varied and not constant as shown in FIG. 4. Therefore, firstly the outer diameters are measured by the photo-sensor 8.

Namely, the multi-joint robot 3 is controlled so that the photo-sensor 8 moves along the portion to be carved on the outer circumferential surface of the green tire G keeping a nearly constant distance a from the center axis C–C', projected light is reflected at the surface of the portion to be carved and the reflected light is received, and distances d to the surface of the portion to be carved is measured based on the received signals at plural points.

Difference between the distance d and the above-mentioned constant distance a shows an outer diameter r of the green tire, therefore (a–d) is calculated to obtain the outer diameter r of the green tire.

Difference $\ddot{A}r$ ($=r-r_0$) between the outer diameter r obtained in this manner and the outer diameter r of a green tire having an ideal shape is variation of the outer diameter, therefore the cut shape data for a green tire having an ideal shape stored in the memory 20a is revised on the basis of the difference $\ddot{A}r$ at plural points.

At a place where the difference $\ddot{A}r$ is small, amount of revise is small, at a place where the difference $\ddot{A}r$ is large, amount of revise is large, and at a place where the difference $\ddot{A}r$ is zero, revise is not carried out. A shape of carved groove formed in accordance with the cut shape data revised in such manner is shown by the two-dots-dash line L2 in FIG. 4.

The multi-joint robot 3 is controlled on the basis of the revised cut shape data to move the cutter 2 for carving, and the carved groove shown by the two-dots-dash line L2 in FIG. 4 is formed.

The green tire G on the support stand 10 is rotated intermittently by a constant rotational angle, and when the green tire G is stopped, the photo-sensor 8 scans the portion to be carved to measure the outer diameters r, the cut shape data is revised and the cutter 2 is driven by the multi-joint robot 3 in accordance with the revised cut shape data to form the carved groove.

Since carving of each groove is carried out from a middle portion toward a shoulder portion on one side of the tread, after one side of the green tire has been carved in order, another side of the green tire is carved in order similarly.

Thus, a plurality of carved grooves g of necessary depths arranged in circumferential direction can be formed.

On the green tire G having the tread formed with a plurality of carved grooves g arranged in circumferential direction is put a mold having lug groove ribs projected from the inner circumferential surface engaging the lug groove ribs with the carved grooves g, and inner pressure is applied to the green tire G to press the green tire against the inner circumferential surface of the mold to form lug grooves. Thus, a product tire of nearly true circle is produced.

In this case, when the green tire G is deformed by the inner pressure into the shape of true circle, the carved groove g becomes so as to have necessary depths. Therefore, the shape of the carved groove g becomes about the same as the shape corresponding to the cut shape data for a green tire having an ideal shape.

Therefore, the lug groove ribs of the mold of a curing machine enter properly in the carved grooves g having necessary depths and shapes to form lug grooves accurately.

As described above, a carved groove having necessary depths can be formed easily without being influenced by variation of outer diameters of the green tire.

Since the cutter 2 is moved by the multi-joint robot 3 having degree of freedom of six axes, positioning of the cutter can be automated, the edge of the cutter 2 can be set at any position accurately and the edge can be kept always perpendicularly to the curved surface of the green tire G to carve accurately.

Marking-off and other manual working can be eliminated, and carving work can be automated almost completely to improve productivity.

Since the portion to be carved is carved in accordance with the revised cut shape data, the carved groove g having necessary depths from the surface of the portion to be carved and a necessary shape is formed. Therefore, cut weight at every portion to be carved can be kept uniformly and accuracy of the cut weight is stabilized, so that variation of tread gauge and groove bottom skid base gauge of the product tire can be suppressed to the minimum and quality of the product tire can be maintained.

What is claimed is:

1. A method for forming a carved groove for a lug groove with a cutter on an outer circumferential surface of a green tire before curing, in such a manner that the carved groove is formed in an area from a middle portion of the outer circumferential surface to a shoulder portion on one side of the outer circumferential surface in a direction substantially along a central axis of the green tire and that the carved groove is given different predetermined depths, as the carved groove is being formed, in accordance with cut shape data for the green tire having an ideal shape, stored in a memory beforehand, comprising:

moving a distance sensor along said area on said outer circumferential surface of the green tire to measure outer diameters of said area;

revising said cut shape data in accordance with the measured diameters of said area; and moving said cutter in accordance with the revised cut shape data for carving.

2. A method for forming a carved groove of a green tire as claimed in claim 1, wherein measurement of said outer diameters of said portion to be carved comprises moving said distance sensor to detect distances to said outer circumferential surface of said green tire at plural points, and subtracting said detected distances from a distance between said distance sensor and a central axis of said green tire to calculate outer diameters of said portion to be carved at plural points.

3. A method for forming a carved groove of a green tire as claimed in claim 1, wherein said cut shape data stored beforehand is revised on the basis of difference between said measured outer diameter of said green tire and an outer diameter of a green tire having an ideal shape.

4. A method for forming a carved groove of a green tire as claimed in claim 1, wherein, if the green tire has an ideal shape, the revised cut shape data is identical to the cut shape data.

5. A method for forming a carved groove of a green tire as claimed in claim 1, wherein:
said area on said outer circumferential surface of the green tire is a subset of the entire circumferential surface of said tire;
after moving said distance sensor, revising said cut shape data, and moving said cutter are completed for said area, the green tire is rotated by a rotational angle; and
said distance sensor is moved along a second area on said outer circumferential surface of the green tire to measure outer diameters of said second area;
cut shape data is revised in accordance with the measured diameters of said second area; and
said cutter is moved in accordance with the revised cut shape data for carving.

6. A method for forming a carved groove of a green tire as claimed in claim 5, wherein the tire is rotated by a constant rotational angle.

7. A method for forming a carved groove of a green tire as claimed in claim 1, wherein when said distance sensor is moved it is kept at a nearly constant distance from a center axis of the green tire.

8. A method for forming a carved groove of a green tire according to claim 1, wherein:
the distance sensor is moved along the area in an axial direction of the tire at a nearly constant distance from a center axis of the tire;
the outer diameter of the area is measured by sensing a distance between the distance sensor and the area at different points; and
the cut shape data is revised by calculating a difference between the sensed outer diameter of the area and a previously stored ideal outer diameter at the different points.

9. A method for producing an off-the-road radial tire, including the step of forming carved grooves each for a lug groove with a cutter on an outer circumferential surface of a green tire for the off-the-road radial tire before curing, in such a manner that each of said carved grooves is formed in an area from a middle portion of the outer circumferential surface to a shoulder portion on one side of the outer circumferential surface in a direction substantially along a central axis of the green tire and that each carved groove is given different predetermined depths, as each carved groove is being formed, in accordance with cut shape data for the green tire having an ideal shape, stored in a memory beforehand, said method comprising the steps of:
moving a distance sensor along said area on said outer circumferential surface of the green tire to measure outer diameters of said area;
revising said cut shape data in accordance with the measured diameters of said area;
moving said cutter in accordance with the revised cut shape data for carving each of said carved grooves;
introducing the green tire that has been formed with said carved grooves in a mold having an inner surface formed with projecting lug groove ribs, with the lug groove ribs fitted in the carved grooves of the introduced green tire, respectively; and
applying inner pressure to the green tire within the mold to press the green tire against said inner surface of the mold to thereby deform the green tire into a shape of a true circle.

10. A method for producing an off-the-road radial tire as claimed in claim 9, wherein measurement of said outer diameters of said portion to be carved comprises moving said distance sensor to detect distances to said outer circumferential surface of said green tire at plural points, and subtracting said detected distances from a distance between said distance sensor and a central axis of said green tire to calculate outer diameters of said portion to be carved at plural points.

11. A method for producing an off-the-road radial tire as claimed in claim 9, wherein said cut shape data stored beforehand is revised on the basis of difference between said measured outer diameter of said green tire and an outer diameter of a green tire having an ideal shape.

12. A method for producing an off-the-road radial tire as claimed in claim 9, wherein, if the green tire has an ideal shape, the revised cut shape data is identical to the cut shape data.

13. A method for producing an off-the-road radial tire as claimed in claim 9, wherein:
said area on said outer circumferential surface of the green tire is a subset of the entire circumferential surface of said tire;
after moving said distance sensor, revising said cut shape data, and moving said cutter are completed for said area, the green tire is rotated by a rotational angle; and
said distance sensor is moved along a second area on said outer circumferential surface of the green tire to measure outer diameters of said second area;
cut shape data is revised in accordance with the measured diameters of said second area; and
said cutter is moved in accordance with the revised cut shape data for carving.

14. A method for producing an off-the-road radial tire as claimed in claim 13, wherein the tire is rotated by a constant rotational angle.

15. A method for producing an off-the-road radial tire as claimed in claim 9, wherein when said distance sensor is moved it is kept at a nearly constant distance from a center axis of the green tire.

16. A method for producing an off-the-road radial tire according to claim 9, wherein:
the distance sensor is moved along the area in an axial direction of the tire at a nearly constant distance from a center axis of the tire;
the outer diameter of the area is measured by sensing a distance between the distance sensor and the area at different points; and
the cut shape data is revised by calculating a difference between the sensed outer diameter of the area and a previously stored ideal outer diameter at the different points.

17. A method for forming a carved groove for a lug groove with a cutter on an outer circumferential surface of a green tire before curing, in such a manner that the carved groove is formed in an area from a middle portion of the outer circumferential surface to a shoulder portion on one side of the outer circumferential surface in a direction substantially along a central axis of the green tire and that the carved groove is given different predetermined depths along the length of the carved groove, as the carved groove is being formed, in accordance with cut shape data for the green tire having an ideal shape, stored in a memory beforehand, comprising:
moving a distance sensor along said area on said outer circumferential surface of the green tire to measure outer diameters of said area, to thus detect a difference between a measured outer diameter of said area and an outer diameter of the green tire having an ideal shape, at plural points on said area;

revising said cut shape data in accordance with said difference in diameter at said plural points on said area; and moving said cutter in accordance with the revised cut shape, thus carving the groove to have the different predetermined depths.

18. An apparatus for forming a carved groove for a lug groove on an outer circumferential surface of a green tire before curing, such that the carved groove is formed in an area from a middle portion of the outer circumferential surface to a shoulder portion on one side of the outer circumferential surface in a direction substantially along a central axis of the green tire and that the carved groove is given different required depths along the length of the carved groove, as the carved groove is being formed, in accordance with cut shape data for the green tire having an ideal shape, stored in a memory beforehand, comprising:

a cutter for carving said outer circumferential surface of said green tire to form said carved groove;

a cutter moving means for moving said cutter;

a distance sensor for detecting distance from itself to said area of the outer circumferential surface of said green tire at plural points on said area, to thus detect a difference between a measured outer diameter of said area and an outer diameter of the green tire having an ideal shapes at each of said plural points;

a sensor moving means for moving said distance sensor; and a control means including said memory storing said cut shape data and controlling said cutter moving means and said sensor means;

said control means controlling said sensor moving means so that said distance sensor moves along said area to measure outer diameters of said area, revising said cut shape data stored beforehand on the basis of the measured outer diameters of said area to obtain revised cut shape data, controlling said cutter moving means in accordance with said revised cut shape data so that said cutter carves said outer circumferential surface of said green tire to form said carved groove.

19. An apparatus for forming a carved groove for a lug groove on an outer circumferential surface of a green tire before curing, such that the carved groove is formed in an area from a middle portion of the outer circumferential surface to a shoulder portion on one side of the outer circumferential surface in a direction substantially along a central axis of the green tire and that the carved groove is given different required depths, as the carved groove is being formed, in accordance with cut shape data for the green tire having an ideal shape, stored in a memory beforehand, comprising:

a cutter for carving said outer circumferential surface of said green tire to form said carved groove;

a cutter moving means for moving said cutter;

a distance sensor for detecting distance from itself to said area of the outer circumferential surface of said green tire;

a sensor moving means for moving said distance sensor; and a control means including said memory storing said cut shape data and controlling said cutter moving means and said sensor means;

said control means controlling said sensor moving means so that said distance sensor moves along said area to measure outer diameters of said area, revising said cut shape data stored beforehand on the basis of the measured outer diameters of said area to obtain revised cut shape data, controlling said cutter moving means in accordance with said revised cut shape data so that said cutter carves said outer circumferential surface of said green tire to form said carved groove.

20. An apparatus for forming a carved groove of a green tire as claimed in claim 19, wherein said cutter and said distance sensor are fixed to a same support member, and said cutter moving means and said sensor moving means are constituted by a common moving means.

21. An apparatus for forming a carved groove of a green tire as claimed in claim 20, wherein said common moving means is a multi-joint robot.

22. An apparatus for forming a carved groove of a green tire as claimed in claim 21, wherein said multi-joint robot has degree of freedom of six axes.

23. An apparatus for forming a carved groove of a green tire as claimed in claim 19, wherein said distance sensor is a reflective photo-sensor.

24. An apparatus for forming a carved groove of a green tire as claimed in claim 19, wherein the cutter is an electric heated cutter having an edge curved in a U-shape.

25. An apparatus for forming a carved groove of a green tire according to claim 19, wherein:

said control means controls said sensor moving means so that the distance sensor moves along the area in an axial direction of the tire at a nearly constant distance from a center axis of the tire;

said distance sensor measures the outer diameter of the area by sensing a distance between the distance sensor and the area at different points; and said control means revises the cut shape data by calculating a difference between the sensed outer diameter of the area and a previously stored ideal outer diameter at the different points.

* * * * *